United States Patent [19]

Viken

[11] Patent Number: 5,472,064
[45] Date of Patent: Dec. 5, 1995

[54] TOTAL FLUID EXCHANGE SYSTEM FOR AUTOMATIC TRANSMISSIONS

[76] Inventor: James P. Viken, 9890 Crestwood Ter., Eden Prairie, Minn. 55347

[21] Appl. No.: 209,061
[22] Filed: Mar. 9, 1994
[51] Int. Cl.⁶ .................................................. F16N 33/00
[52] U.S. Cl. ......................... 184/1.5; 184/6.4; 184/55.1; 184/57; 184/105.1; 184/108; 141/67; 141/94; 141/98; 73/53.07; 356/70
[58] Field of Search .......................... 184/1.5, 6.4, 55.1, 184/57, 96, 105.1, 108; 141/67, 94, 98; 73/53.07; 356/70

[56] References Cited

U.S. PATENT DOCUMENTS

| | | |
|---|---|---|
| 4,095,673 | 6/1978 | Takeuchi . |
| 4,114,644 | 9/1978 | Piper . |
| 4,570,069 | 2/1986 | Gager ........................................ 356/70 |
| 4,951,784 | 8/1990 | Bedi . |
| 4,958,666 | 9/1990 | Kocourek . |
| 5,056,621 | 10/1991 | Trevino . |
| 5,062,500 | 11/1991 | Miller . |
| 5,092,429 | 3/1992 | Linares et al. . |
| 5,190,120 | 2/1993 | Watts ........................................ 184/1.5 |
| 5,318,080 | 6/1994 | Viken ........................................ 184/1.5 |
| 5,370,160 | 12/1994 | Parker ........................................ 141/98 |
| 5,372,219 | 12/1994 | Peralta ........................................ 184/1.5 |

FOREIGN PATENT DOCUMENTS

| | | | |
|---|---|---|---|
| 0295136 | 11/1989 | Japan ........................................ 356/70 |
| 0072299 | 3/1990 | Japan ........................................ 184/1.5 |
| 0107183 | 4/1993 | Japan ........................................ 356/70 |

Primary Examiner—Thomas E. Denion
Assistant Examiner—Christopher Verdier
Attorney, Agent, or Firm—James R. Cwayna

[57] ABSTRACT

A system for providing total fluid exchange for an automatic transmission which interconnects with the transmission's opened cooling circuit to deliver new, fresh fluid to the transmission while simultaneously extracting the spent, used fluid. The system provides a means of quick and random interconnection to an opened cooling circuit and means of identifying and aligning direction of flow in such cooling circuit. The system can accurately calibrate and regulate the rate that fresh fluid will flow into the transmission to be the same as that at which the used fluid is extracted, both of which are regulated to flow at the same rate that fluid normally circulates at in the cooling circuit when it is closed under similar operating conditions. Quick coupling devices are used for ease and speed of interconnection of the system into operative position, for quick removal of the system and for reconnection of the opened cooling circuit for ease of repeat, periodic servicing by the system as a regular maintenance procedure.

10 Claims, 3 Drawing Sheets

TOTAL FLUID EXCHANGE SYSTEM FOR AUTOMATIC TRANSMISSIONS

BACKGROUND—RELATED APPLICATIONS

As stated in the Prior Art Statement, Applicant currently has on file an application entitled Transmission Fluid Changer. That application was filed on Oct. 23, 1991 under Ser. No. 07/781,322. A Notice of Allowance was issued on Nov. 2, 1993 and the Final Fee was paid on Dec. 28, 1992.

FEDERAL SPONSORSHIP

This invention is not made under any Federally sponsored research or under any other independently sponsored research and development program.

FIELD OF THE INVENTION

This invention relates generally to vehicular transmission fluid replacement apparatus and more specifically to a system for total fluid exchange in an automatic transmission with a sealed or inaccessible torque convertor which insures that all of the used, spent transmission fluid will be removed and replaced with fresh fluid.

OBJECTS AND ADVANTAGES OF THE INVENTION

The type of operational error in the applicant's first invention where a fluid exchanger can be interconnected in a misaligned fashion cannot occur with the new invention, which was invented to provide a solution to this potentially serious problem. The new apparatus may be randomly interconnected to a cooling circuit without having to identify the direction of flow before making interconnection. This makes the invention especially convenient to use because it can be quickly connected with no concern for flow direction through the cooling circuit. After it is interconnected the engine can be immediately started to cause the transmission to operate. The invention then immediately indicates the direction of flow and allows the transmission to continue operating, thereby giving the operator an opportunity to calibrate the invention after it has been interconnected while the engine is running, which could not be done with the first invention.

If it is indicated that the invention's internal circuits do not align with the direction of flow in the cooling circuit, this is immediately corrected by a quick reversal of the invention's internal circuits thereby resulting in the correct alignment with the particular direction of fluid flow through the cooling circuit to absolute certainty thus insuring proper transfer of fluid during the exchange process once the invention is activated. After the fluid exchange process has been completed in total, the invention can be inactivated, allowing the transmission to keep operating and circulating its fluid through the cooling circuit that is closed within the invention.

The invention is much easier to calibrate and permits calibration after the invention is interconnected but before the fluid transfer begins. It provides much improved control over flows during operation, preventing any possible starvation conditions which can occur without precision monitoring and control, conditions which can seriously damage the transmission's internal pumping system, bearings and seals. The manner in which obstruction of flow in the cooling circuit or lack of fluid in the transmission pan causes starvation conditions is well known by those skilled in the art.

An important key feature then, of this invention, unobvious to the art which makes it very convenient and worry free to operate, is the capability of the invention to allow the engine to be started immediately after it has been randomly interconnected to the cooling circuit of the transmission, allowing the transmission to operate, thereby pumping fluid in either direction through a closed bypass within the apparatus and back into the transmission just as if the cooling circuit hadn't been opened.

Another important feature of the invention which makes it convenient to use is its capability to be shifted from the inactive-bypass mode with the transmission operating to its activated fluid exchange mode which allows the fluids to be transferred until they have been totally exchanged. When the instrumentation indicates that all the used, dirty fluid has been replaced with clean, fresh fluid, the operator can easily and quickly shift the invention back into the inactive-bypass mode, which again allows the transmission to keep operating and circulating fluid through its cooling circuit.

With the applicant's first invention the engine of the vehicle had to be simultaneously started when the apparatus was activated, and when the procedure was completed the engine of the vehicle had to be simultaneously stopped as the apparatus was inactivated, otherwise a starvation condition would occur. This required two individuals for the procedure to be completed, one apparatus operator and another individual to sit in or near the vehicle to be prepared to immediately and spontaneously start or stop the engine upon the operator's command. With the applicant's new invention only one person is required for its use and this is a significant advantage over the applicant's first invention.

One of the basic objects of this invention is to provide a total fluid exchange without any disruption of normal flow patterns within the transmission, thus preventing any starvation conditions which can quickly damage the transmission. With the unit as provided herein, such a condition is just about impossible.

Another objects of this invention is to be able to monitor various pressures, flow rates, and clarity of the fluids being exchanged accurately at all times with the most convenience possible.

A further object of the invention is to provide a quick, random method for interconnecting the system to the cooling circuit without having to first identify the direction that fluid flows through the cooling circuit. Determining the direction of flow in a cooling circuit before interconnecting the system can be quite difficult to ascertain for certain.

Major changes were designed and incorporated into the new invention after the applicant's manufacture of the old unit and from experience gained in true applications to and with industry and comprise unique, unexpected and noticeably effective solutions to previously troublesome operational problems resulting from the limitations of the applicant's first invention.

Still further objects and advantages will become apparent from a consideration of the ensuing description and drawings.

SUMMARY OF THE INVENTION

It is generally accepted and recommended practice to change the fluid which is readily accessible in automatic transmissions at regular intervals as specified by the manufacturer, with more frequent service for severe duty usage. Up until the 1970's it was possible in many vehicles to institute a near complete fluid exchange through factory supplied drain plugs in the torque convertor accessible through an inspection location. With the advent of front wheel drive vehicles and lock up clutches in torque convertors, drain plugs were no longer installed by the manufacturer. The practice of near total exchange of transmission fluid was an effective maintenance procedure that vanished as a manufacturer's specified service procedure. This was replaced with the usual manufacturer's specification to replace the fluid contained in the transmission pan only, on a periodic basis, which comprises about only 20% to 25% of the total fluid volume contained by the transmission, a desireable practice in and of itself but not nearly as effective as a total fluid exchange for cleaning and lubricating the transmission, or for conditioning its seals.

The system is interconnected directly to an opened cooling circuit of an automatic transmission, a circuit which extends to a cooler, through it and back again, between an outlet port and an inlet port of the transmission through which the transmission's fluid circulates as a means of cooling. The system is positioned conveniently next to the side of the vehicle being serviced. The system includes a receptacle for the fresh, new fluid and a separate receptacle to receive the spent, used fluid.

In a first form of the invention, regulated compressed air provides the pressure to deliver the fresh fluid. Various valves, gates, pressure and other indicator or control elements to maintain proper directed flow are included and one of the flow circuits within the apparatus is provided with a tap from which to extract a sample of the used fluid. Also included are sightglasses to visually examine the clarity of the used fluid in comparison to the new fluid. Also included is a two position valve which allows either straight through flow or flow reversal between the two lines which carry the used and fresh fluid to and from the opened cooling circuit. This is required to accomodate the two directions in which flow may occur in the transmission cooling circuit, related to the random manner in which the invention's two fluid delivery lines are interconnected.

This form is obviously attuned to mechanical control and will require close attendance while operating.

The second form of the system includes the same operative elements with the primary difference being that the control of the unit is provided by an electronic system with a microprocessor and a control panel for entering simple on/off commands and for indicating the status of key functions, and a printer to produce a written record of the service specifying pressure, rate of flow, before and after clarity of fluid, and total number of quarts of fresh fluid used. With this electronic embodiment, the microprocessor controls all system functions either automatically or semi-automatically.

DESCRIPTION OF THE INVENTION

Figure 1:
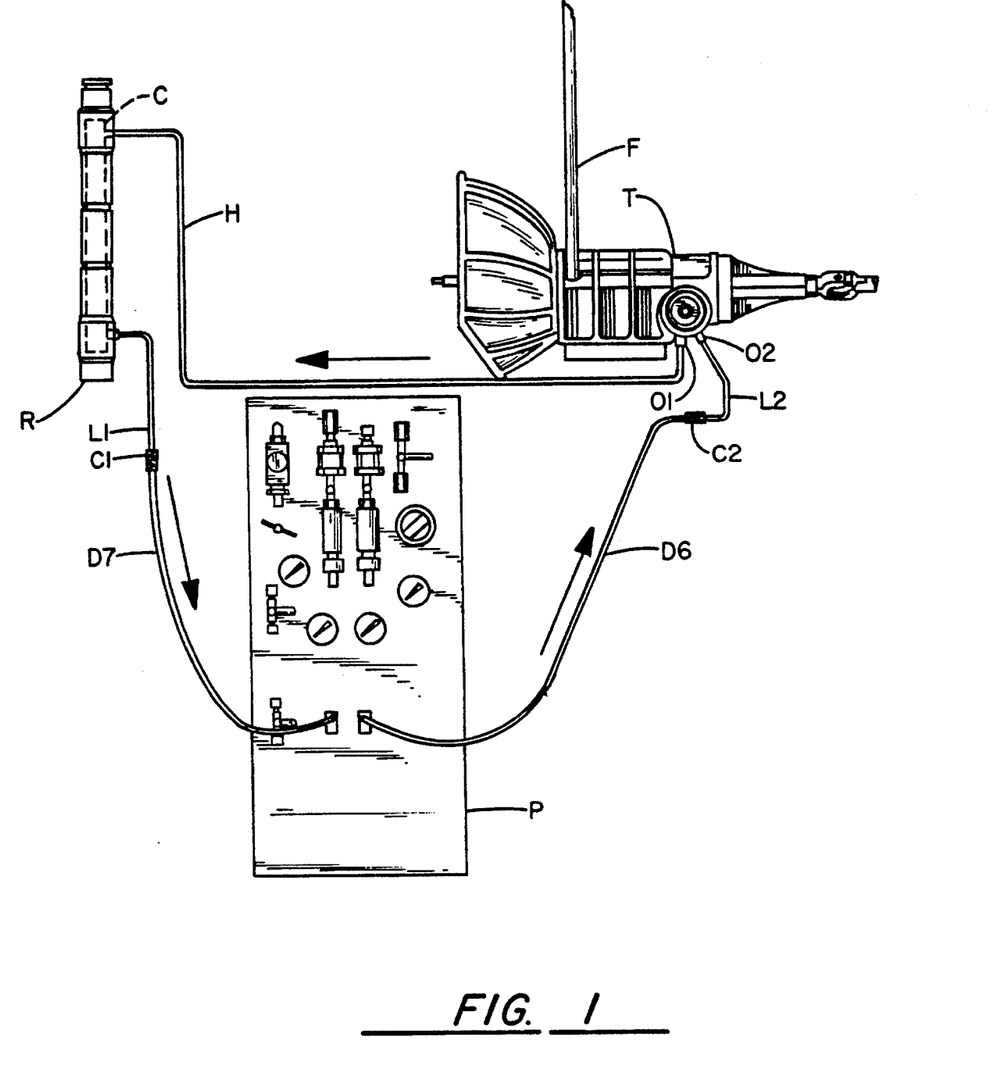
FIG. 1 is a representative illustration of the applicant's system as it is positioned with respect to a transmission and its fluid cooler and illustrating a representative interconnection of the system into that cooling circuit which has been opened.

In accordance with the accompanying drawings, a typical embodiment of the applicant's system is illustrated positioned for use in FIG. 1. As illustrated therein, a transmission T is provided and includes a fill tube F that is provided for any transmission to add fluid under all conditions. It should be noted that although this transmission is for a front engine, rear wheel drive vehicle, the applicant's unit is equally usable when changing the fluid of a front wheel drive vehicle without departing from the scope of the invention.

A fluid cooler C for transmission T is often and usually an integral part of a vehicle radiator R if the vehicle is liquid cooled, as it is here. Certain vehicles designed for severe duty usage have an additional external cooler in series in the cooling circuit with cooler C inside radiator R.

As illustrated, the applicant's invention includes a control panel P located between cooler C and transmission T. The operative portions of applicant's invention in FIGS. 2 and 3 as will be discussed hereinafter, are arranged behind control panel P.

The cooling circuit consists of fluid carrying lines that extend between an outlet port O1 of transmission T and an inlet port O2 of transmission T with cooler C interconnected in-line between ports O1, O2. In the example represented by FIG. 1, the relatively hot fluid from transmission T is brought into the upper end of cooler C by a fluid delivery line H. The cooling return line in this illustration has been opened, thereby divided into two segments which are designated as the side upstream to the invention, a cooling line L1, and as the side downstream to the invention, a cooling line L2. Lines L1, L2 connect to ports O1, O2 respectively and terminate at one side each of the two quick couplings C1, C2 which have been attached to L1, L2 at an orifice of each which resulted from the cooling circuit being opened. The other sides of couplings C1, C2 are joined to flexible fluid delivery lines D7, D6 of sufficient length. Couplings C1, C2 are pressure and fluid carrying and separate into two pieces each on demand. Such a combination for coupling lines is well known to persons skilled in the art. As illustrated, Lines D7, D6 are brought into the lower sector of Panel P for purposes which will become obvious when FIGS. 2 and 3 are described.

With the description to this point it is obvious that applicant's system is shown interconnected to the cooling circuit. It should be noted that for purposes of explaining the invention the direction of flow in the cooling circuit is indicated in FIG. 1, whereas in actual practice the invention would be interconnected without identifying the direction of flow beforehand.

Figure 2:
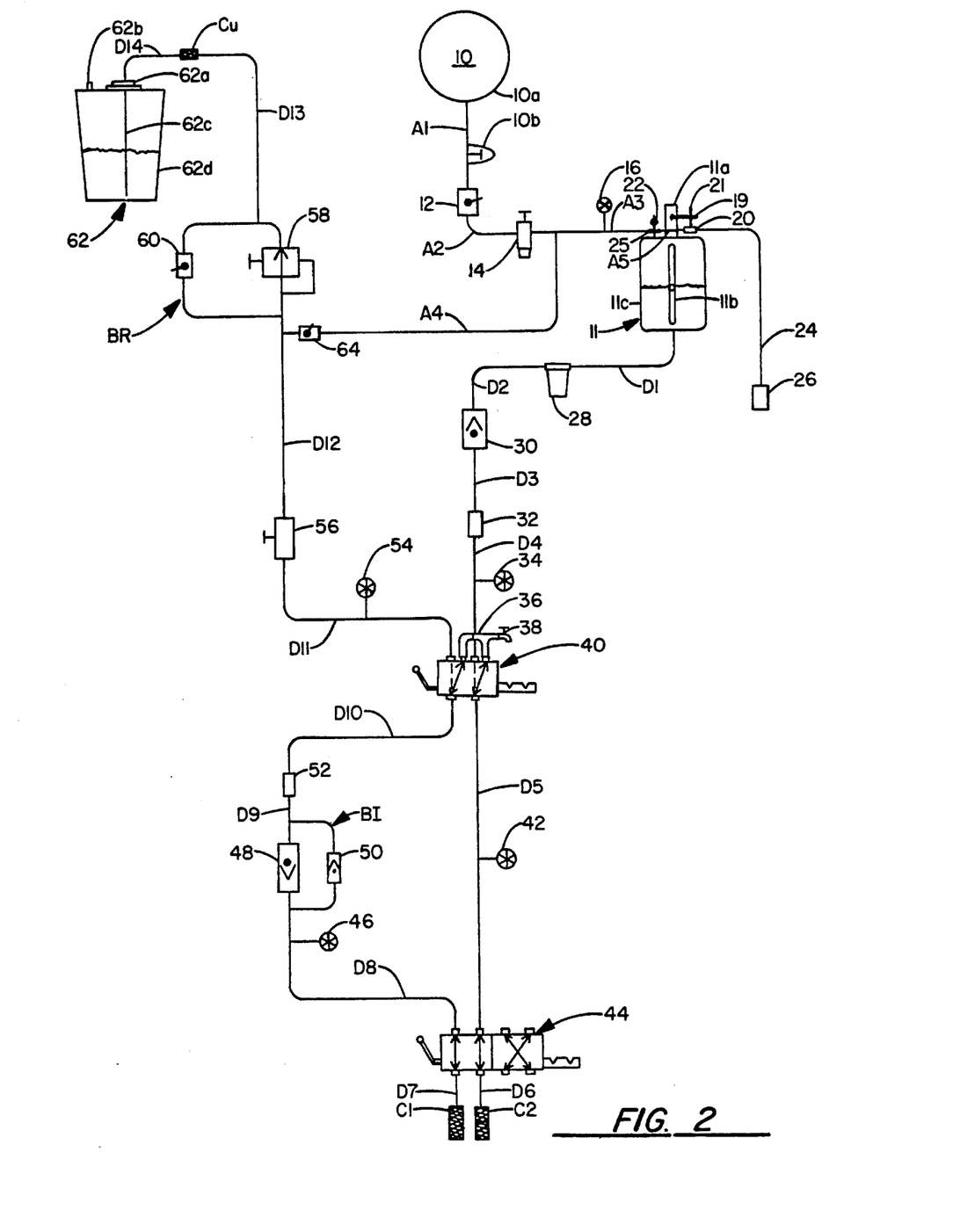
FIG. 2 is a schematic illustration of a mechanical and fluid arangement to obtain the objects of the invention.
Figure 3:
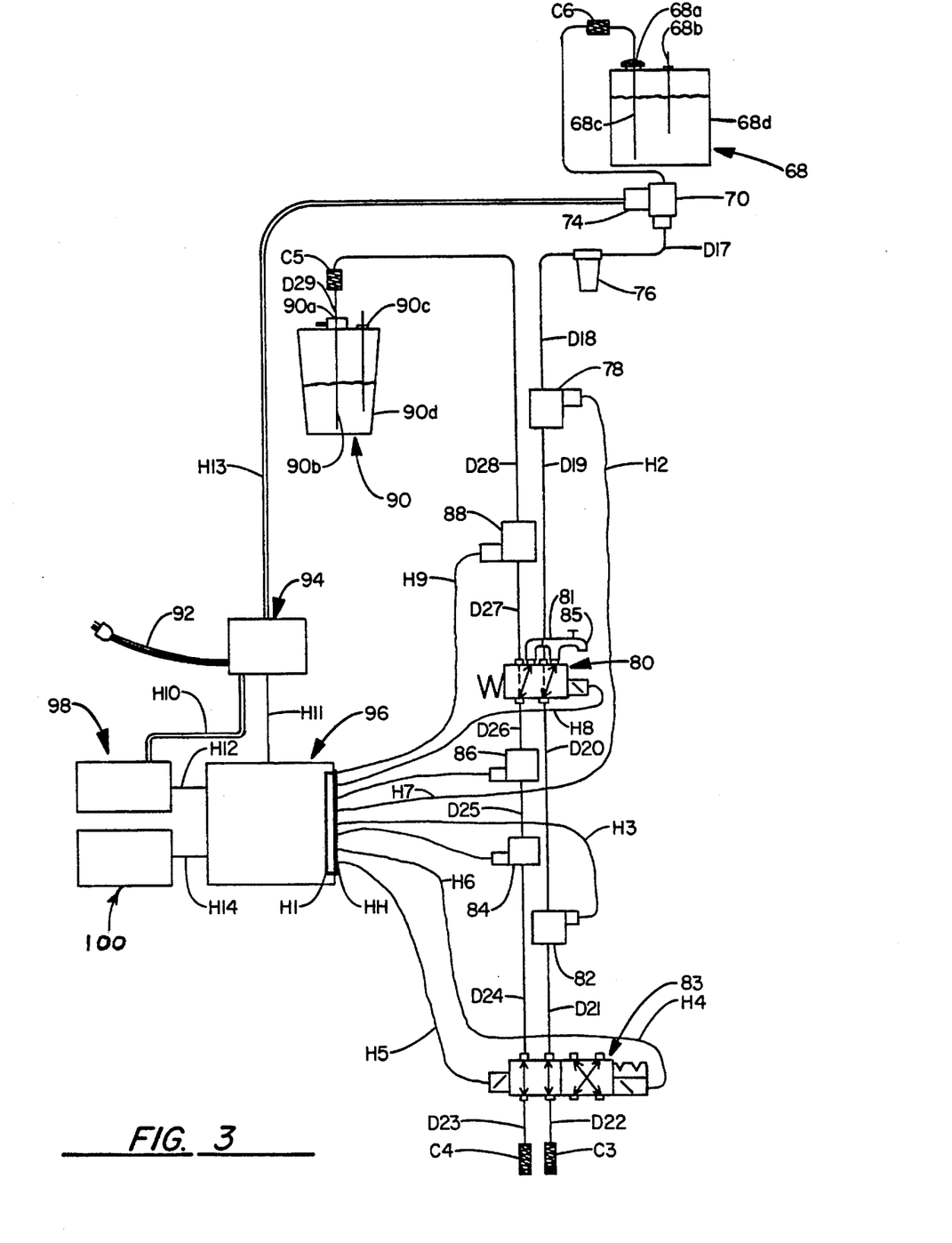
FIG. 3 is a schematic illustration of what may be termed an electronic microprocessor controlled system.

Applicant's system as illustrated in FIG. 2 may be termed a mechanical system as it primarily includes various mechanically operated valves although its activating force includes a source of compressed air or gas 10 contained in a housing 10a. Source 10 is connected to an air or gas filter 10b by an air delivery line A1. Filter 10b provides a means of conditioning compressed air or gas to prevent debris and condensation which might be present in the compressed air or gas from source 10 from contaminating the fresh transmission fluid 11c contained in a pressurizable fresh fluid supply receptacle assembly 11. A fluid level indicator 11b displays the level of fresh fluid 11c being held in receptacle 11. Line A1 connects filter 10b to on-off ball valve 12, which serves as a pressure holding device. Valve 12 is connected to a compressed air or gas regulator 14 by an air line A2. Regulator 14 is repeatably adjustable and is comprised of materials compatible with use of compressed air or gas, and designed to operate from 5 to 125 pounds per square inch.

Regulator 14 is connected by an air line A3 to a T-fitting 25 received into a female threaded sleeve which has been welded into receptacle 11. Receptacle 11 has a main fill valve, a large ball valve, 11a with female threads attached to a male threaded stem welded to a similar sized orifice of the upper wall of receptacle 11. Valve 11a is able to be repeatedly opened and closed over time, reliably able to hold pressure up to 125 pounds per square inch, and large enough to provide for convenient and quick filling of fresh fluid into receptacle 11 when fully opened. An one-off actuating lever 19 of valve 11a can only be opened when an actuating lever 21 of an on-off exhaust valve 20 is shifted from its full vertical position which is closed tight and pressure holding to its horizontal position which is completely open.

Line A3 is connected to fresh fluid receptacle 11 by T-fitting 25. Receptacle 11 in the form shown is a five gallon, approximately ⅛ inch thick steel walled pressure tank with numerous female threaded sleeves welded through its walls as needed to connect various; fittings for purposes which include securing and sealing indicator 11b, securing and sealing the delivery of compressed air or gas from source 10, and securing and sealing the delivery of fresh fluid 11c out of tank 11. The means of doing this as well as connecting air or fluid delivery lines one to another, or to sleeves, indicators or valves is well known to those skilled in the art and will therefore not be further discussed.

Tank 11 is designed to reliably hold the maximum required pressure of 125 pounds per square inch. A pressure relief safety valve 22 is connected to T fitting 25 and is preset to relieve pressure at 125 pounds per square inch, thus preventing receptacle 11 from being pressurized beyond that level as a safety feature to prevent accidental burst, or damage to any other components which are attached. A pressure gauge 16 is provided in line A3, and indicates the pressure at which regulator 14 is adjusted to.

Exhaust valve 20 is connected by an air line A5 to T-fitting 25, allowing compressed air or gas to be vented when valve 20 is opened, a necessity in order to open valve 11a in order to fill receptacle 11 with fresh fluid 11c before the system can be operated, thereby preventing a sudden and potentially unsafe release of compressed air through valve 11a.

Valve 20 is connected to an exhaust muffler 26 by an exhaust air line 24, and provides a means of discharging compressed air or gas from receptacle 11 without excessive noise.

A fluid delivery line D1 connects receptacle 11 with a fluid filter assembly 28 which has a replaceable fluid filter, well known by those skilled in the art. All fluid delivery lines are low pressure 200 pounds per square inch working pressure flexible hydraulic hose with an inside diameter large enough to appropriately flow fresh fluid 11c and used fluid 62d. Of course many other suitable materials can be used to comprise many of these lines such as copper, steel or aluminum, as should be well understood by these skilled in the art.

A fluid delivery line D2 connects filter 28 to a directional in-line flow meter 30, which indicates flow rates in a range of 0.1 to 1.0 gallon per minute which typically occur in everday usage of the system. A fluid delivery line D3 connects flow meter 30 to a sightglass 32, which is of a size large enough to adequately view the fluid passing therethrough and assess its quality visually. A pressure gauge 34 is provided in a fluid delivery line D4.

Line D4 connects sightglass 32 to a manually operated, two position with detents, six way, direction control valve assembly 40. Knowledge of this type of valve and its design and operating characteristics is well known by those skilled in the art. A closed-loop bypass line 36 is attached at both ends to two of the ports of valve 40. A threaded tap 38 is connected to bypass line 36 from which fluid samples can be manually drawn.

A fluid delivery tine D5 connects valve 40 to a manually operated, two position with detents, four way, direction control valve assembly 44. Knowledge of this type of valve and its design and operating characteristics is well known by those skilled in the art. A pressure gauge 42 is provided in line D5. A fluid delivery line D6 is of adequate length to connect valve 44 to coupling C2 as illustrated in FIG. 1. A fluid delivery line D7 is also of adequate length to connect coupling C1 to valve 44. Coupling C1 is also illustratrated in FIG. 1.

A fluid delivery line D8 connects valve 44 to a directional in-line flow meter 48. A pressure gauge 46 is provided in line D8. A one-way check valve 50 is interconnected to a bypass circuit BI to restrict flow in the same direction that meter 48 flows. Circuit BI connects line D9 to a fluid delivery line D8. Line D9 connects flow meter 48 to a sightglass 52 which is of a size large enough to adequately view the fluid passing therethrough and assess its quality visually. A fluid delivery line D10 connects sightglass 52 to valve 40. A fluid delivery line D11 connects valve 40 to an adjustable needle flow control valve 56. A pressure gauge 54 is provided in line D11. A fluid delivery line D12 connects valve 56 to an adjustable pressure relief valve 58, which in the form shown has a relief range from 5 to 75 pounds per square inch, which is adequate to cover the range of pressure restriction heeded to service most vehicles. An on-off ball valve 60 is interconnected to bypass circuit BR which bypasses valve 58 when valve 60 is in the open position, thus connecting line D12 to a fluid delivery line D13.

An air delivery line A4 connects conditioned, regulated compressed air or gas from source 10 to an on-off valve 64, which is spring loaded to remain in its off position and must be manually held open. Valve 64 is connected to line D12. When opened, valve 64 allows filtered, regulated compressed air or gas from source 10 to flow into line D12, thereby pressurizing it, to the level set by regulator 14 and relief valve 58 if valve 60 is closed.

Line D13 connects valve 58 to a quick coupling assembly Cu. Coupling Cu connects line D13 to a fluid delivery line D14, which passes through a cap 62a of a used fluid receptacle assembly 62 as it connects to a discharge tube 62c. Receptacle 62 is a sufficiently rigid, transluscent plastic, five gallon container which allows rapid visual determination of the level of fluid therein contained. Tube 62c extends well into receptacle 62. A vent 62b is connected to the top side of receptacle 62 as is cap 62a.

DESCRIPTION OF PARTS OF AN ADDITIONAL EMBODIMENT

FIG. 3 illustrates an additional embodiment which is comprised of numerous electrically powered, electronically indicating or controlled components which are connected by suitable wiring to an electrically powered, electronic microprocessor which serves as a centralized receiver of electronic indicating signals, and as a processor of such signals according to suitable software and internal architecture, and as an emitter of electronic control signals which determine and regulate the functions of the system.

The embodiment of FIG. 3 is also interconnected to a cooling circuit of an automatic transmission in the same manner as the embodiment illustrated in FIGS. 1, 2 with quick coupling assemblies C3, C4 in FIG. 3 having been substituted for quick coupling assemblies C1, C2 of FIGS. 1, 2. Therefore, couplings C3, C4 in FIG. 3 are connected to cooler lines L1, L2 (FIG. 1) such that C3 (FIG. 3) is connected to line L1 (FIG. 1) and C4 (FIG. 3) is connected to line L2 (FIG. 1). Fluid delivery lines D22, D23 are flexible and of sufficient length to serve as the means for the system to be interconnected to the cooling circuit of transmission T.

A fresh fluid receptacle 68 has a vented cap 68a which is attached to the top side of receptacle 68. Receptacle 68 has a horizontally visible fluid level indicator 68b attached into its top side. In the form shown and described, fresh fluid receptacle 68 is a 55 gallon steel drum. A delivery tube 68c is connected to a quick coupling assembly C6, which in turn connected to a fluid delivery line D16, Tube 68c extends deep in receptacle 68 with an angular cut orifice to allow unrestricted flow of fresh fluid 68d out of receptacle 68. Line D16 is connected to an internally relieved, self-priming pump 70 which is internally relieved at 100 pounds per square inch and mechanically linked to and powered by an electric pump motor 74. Those skilled in the art understand the method by which such an electric motor is mechanically linked to such a pump and how internal relief valving is used at a specific pressure. Of course this is but one means of providing a pressurized fresh fluid source. Pump 70 is directly connected by a fluid delivery line D17 to a fluid filter assembly 76 having a replaceable fluid filter. Filter 76 is connected by a fluid delivery line D18 to an electronically controlled, electrically operated, pressure compensated flow control valve 78. This type of valve is well known to those skilled in the art. A fluid delivery line D19 connects valve 78 to an electronically controlled, electrically operated, two position, six way, direction control valve assembly 80. This type of valve is well known to those skilled in the art. A closed loop bypass line 81 is connected to two of the ports of valve 80.

Threaded tap 85 is connected to line 81. A fluid delivery line D20 connects valve 80 to an electronic bi-directional flow indicator 82. A valve of this type is well known to someone skilled in the art. A fluid delivery line D21 connects indicator 82 to an electronically controlled, electrically operated two position with detents, four way, direction control valve assembly 83. This type of valve is well known to someone skilled in the art. A fluid delivery line D22 connects valve 83 to coupling C4. A fluid delivery line D23 connects coupling C3 to valve 83. A fluid delivery line D24 connects valve 83 to an electronic bi-directional flow indicator 84. A fluid delivery line D25 connects flow indicator 84 to an electronic infrared clarity indicator 86.

A fluid delivery line D26 connects clarity indicator 86 to valve 80. A fluid delivery line D27 connects valve 80 to an electronically controlled, electrically operated, pressure compensated flow control valve 88. A fluid delivery line D28 connects valve 88 with a quick coupling assembly C5 which is connected by a fluid delivery line D29 to a discharge tube 90b which passes through a vented cap 90a into a used fluid receptacle 90. Cap 90a is attached to the top side of receptacle 90. In this form receptacle 90 is a 55 gallon steel drum with a horizontally indicating fluid level indicator 90c installed into its top side.

A three wire AC power line with ground wire and 3 prong plug 92 is connected to a regulated AC power supply assembly 94 and supplies 110 volt, alternating current to power supply 94 when the three pronged plug is installed in a suitable receptacle. Power supply 94 is connected by a three wire AC line with ground wire H10 to control panel assembly 98. Those in the art are well familiar with control panels and how specific indicators and switches are connected to control panel faceplates. A three wire AC line with ground wire H13 connects pump motor 74 to power supply 94. Panel 98 also has the following switches and indicators which are not illustrated: a main on-off lighted switch which connects and disconnects AC power to the unit; a system activating push button switch used to change the system's mode from its inactive, calibration mode or from a pause mode to its activated fluid exchange mode; a push button deactivating switch to change the system's mode back to the inactive, calibration mode in case the operator notices a problem; a red light to signal when the system is in its inactive, calibration mode; a green light to signal when the calibration has been completed and when the system is ready to be activated to exchange fluids; a white light to indicate if the system has been placed in pause mode in order to service the pan of transmission T; and an orange light to indicate the apparatus is in its activated mode exchanging fluids; an electronic buzzer and tone generator; and multiple, colored, digital readouts which continually and accurately indicate any fresh fluid flow rate, used fluid flow rate, total gallons of fresh fluid delivered and total gallons of used, spent fluid extracted, as well as level of clarity of fluid circulating through the cooling circuit. These are not explicated or illustrated as they are well known by someone skilled in the art.

Power supply 94 is connected to an electronic microprocessor assembly 96 by a 3 wire AC line with ground wire H11. A wiring harness with jack assembly HH is connected to microprocessor 96 by use of a multiple wire jack receptacle assembly HI. Such a method of connecting a wiring harness is well known by those skilled in the art. Harness HH holds a number of distinct multiple wire lines, some three, four or even five wire lines, depending on the specific design of the electronic parts and assemblies of the system. Each multiple wire line of harness HH leads to various valves and indicators. Microprocessor 96 receives electronic signals from indicators 82, 84, 86 and sends controlling signals to valves 78, 80, 83, and 88 after processing received signals.

The functions and capabilities of microprocessor 96 to receive and process signals received from its indicators and to send its processed signals to control valves is well understood by those skilled in the art.

A multiple wire line H12 connects microprocessor 96 to the variety of indicators and function selectors of control panel 98. A multiple wire line H2 connects flow control valve 78 to microprocessor 96, A multiple line wire H3 connects a flow indicator 82 to microprocessor 96. A multiple wire line H4 connects one of ;he activating solenoids of valve 83 to microprocessor 96 and a multiple wire line H5 connects the other activating solenoid of valve 83 to microprocessor 96. A multiple wire line H6 connects flow indicator 84 to microprocessor 96. A multiple wire line H7 connects clarity indicator 86 to microprocessor 96. A multiple wire line H8 connects the activating solenoid of valve 80 to microprocessor 96. A multiple wire line H9 connects flow control valve 88 to microprocessor 96. A multiple wire line H14 connects microprocessor 96 to an electronic printer assembly 100.

OPERATION OF INVENTION—FIGS. 1 AND 2

This operational statement is made with regard to FIG. 2, applicant's first embodiment utilizing FIG. 1 as an operational, positioning statement. It is assumed that it is well understood that transmission T is illustrated in FIG. 1 and will therefore no longer be repeated.

Receptacle 11 is filled with approximately five gallons of fresh, new transmission fluid 11c. Used fluid receptacle 62 is empty. Fresh fluid 11c contained in receptacle 11 is pressurized by compressed air from source 10 which has been conditioned by filter 10b. The pressure of fluid 11c indicated at pressure 16 is controlled by regulator 14.

While the invention is randomly interconnected to the opened cooling circuit between lines L1, L2 of transmission T as shown in FIG. 1, transmission T is not operating because the vehicle's engine has been turned off to prevent hot transmission fluid spray. After the connections are securely made the engine is started and transmission T is operated in drive at idle with the wheels securely braked and chocked or the vehicle lifted so the drive wheels cannot touch any surface.

Fresh fluid 11c contained in receptacle 11, even though under pressure, is restrained through the lines D1, D2, D3, and D4 when valve 40 is in its usual resting position which is an inactive, calibration mode which disconnects both fresh fluid receptacle 11 from line D5, and line D10 from used fluid receptacle 62. When valve 40 is in this resting position, lines D5, D10 are connected together by line 36, which allows fluid to flow unobstructed from outlet port O1 to outlet port O2 (FIG. 1). A specific procedure is followed by the operator to calibrate the interconnected system during this inactive, calibration mode with the transmission operating. The operator checks pressures 42, 46 to verify that fluid is flowing, indicated by positive readings which are recorded by the operator. If pressures 42, 46 read positive and flow indicator 48 does not indicate flow, used fluid 62d is flowing through the bypass circuit BI around indicator 48 and the direction of flow in the cooling circuit is not aligned properly with the position of valve 44.

This non-alignment condition, when it exists after interconnection, is easily corrected by shifting the manual control level of valve 44 to its alternate, flow reversing position. Because in the example illustrated in FIG. 1, the direction of flow in the cooling circuit is already aligned with the flow directions of the system, the operator begins calibration by observing and recording pressures 42, 46 and rate of flow at meter 48, while keeping the transmission operating.

The operator then continues calibrating the apparatus by opening valve 12 and adjusts regulator 14 to read approximately 10 pounds per square inch higher at pressure 34 than at pressures 42, 46. The additional ten pounds per square inch pressure compensates for pressure losses due to line resistance and provides enough air flow to signal when pressure relief valve 58 is adjusted to unload properly with spring loaded valve 64 open. To do this valve 64 is held open and relief valve 58 is adjusted until air begins to pass therethrough, emitting a hissing signal at approximately the same pressure indicated at both pressures 42, 46, thus signalling that line D12 will hold the used fluid 62d flowing into the used receptacle 62 at that same approximate pressure when the apparatus is activated. Valve 64 is then released allowing it to close. As valve 12 is opened, and valve 20 and valve 11a are securely closed, the fresh receptacle 11 builds up pressure to the level set by regulator 14, and holds it to exert the same pressure per square inch on the fresh fluid 11c which will force the fresh fluid 11c through lines D1, D2, D3 and D5 and ultimately into inlet port O2 (FIG. 1) of transmission T when the control lever of valve 40 is moved into its activated position.

At this point a sample of the used fluid 62d is drawn from tap 38 to later compare with another sample drawn from tap 38 when the total fluid exchange has been completed. The operator then must make a choice. The engine may be turned off to stop transmission T from operating so that the pan of transmission T may be removed, drained, inspected for debris and cleaned. If transmission T uses a filter it is replaced. Knowledge of the pan, filter and screen is common to those skilled in the art. If there is no filter, but a screen, it is inspected for tears and cleaned or replaced as necessary. The pan is then installed with a fresh gasket and refilled through the transmission filler tube F (FIG. 1).

At this point the engine is started and transmission T is operated in drive and the system is shifted to its activated mode by moving the operating lever of valve 40, to now connect fresh fluid receptacle 11 to inlet port O2 (FIG. 1) and connect the outlet port O1 to used receptacle 62, thus beginning the total fluid exchange procedure.

An alternate method, is sometimes utilized. If the operator is certain that transmission T has a screen that was recently checked or a filter that was recently changed, pan removal is eliminated and the engine is kept running with transmission T operating with the total fluid exchange system in its inactive, calibration mode. The operator then shifts valve 40 into its secondary position which activates the system immediately with transmission T continuing to operate as before.

Activating the apparatus immediately results in used fluid 62d flowing from outlet port O1 (FIG. 1) into line D8, past pressure 46 which indicates the pressure of the flow, through meter 48 which reads positive and indicates rate of flow, through line D9 to sightglass 52, through line D10, through valve 40, through line D11, past pressure 54, through flow valve 56 which can be adjusted if flow begins to change significantly, through line D12, through relief valve 58 which has been adjusted to hold the flow of used fluid at the desired pressure, through line D13, through quick coupling C3, through line D14, through cap 62a, through discharge tube 62c and into the used receptacle 62, thereby displacing air out of receptacle 62 through vent 62b. Fresh fluid 11b simultaneously flows at the pressure set by regulator 14 through line D1, through filter 28, through meter 30, through sightglass 32, past pressure 34 through line D4, through valve 40, past pressure 42 through D5, through valve 44 and into inlet port O2 (FIG. 1) of transmission T. Regulator 14 is adjusted as necessary to keep fluid 11c flowing at the same approximate rate as fluid 62d indicated at meter 30.

Valve 60 is opened to permit used fluid to bypass relief valve 58 for certain vehicles which circulate fluid through their cooling circuit at such low pressure that fluid would be unduly restricted by valve 58 set at its lowest setting of 5 pounds per square inch.

When the total fluid exchange procedure is activated in the manner described above, proper calibrations have been determined during the inactive, calibration mode, and are instituted causing the flow rates of fluids 11c, 62d to be approximately equal to each other and approximately the same as the rate at which fluid was flowing in the closed cooling circuit of transmission T in drive at idle prior to its opening. In the activated mode, as fluids flow, the operator compares the clarity of used fluid 62c flowing through sightglass 52 to fresh fluid 11c flowing through sightglass 32 which serves as the standard of clarity to be attained within sightglass 52. When the color and clarity of sightglass 52 appears to be approximately the same as that displayed by sightglass 32, the total exchange of fresh fluid for used fluid has been accomplished and the operator moves the operating lever of valve 40 back to the usual resting position, the system's inactive, calibration mode, which again allows the fluid in transmission T to freely circulate through the now reconnected, closed cooling circuit. At that time a sample of fluid circulating through transmission T is drawn from tap 38 and represents the quality, color and clarity of the fluid present in transmission T after used fluid 62d is replaced with fresh fluid 11c. The operator then checks the fluid level of transmission T by inspecting the dipstick contained in filler tube F (FIG. 1) and adds any additional fluid necessary. If the level is too high which rarely occurs, the excess can be removed through tap 38 while transmission T continues to operate with the system in its inactive, bypass mode.

When the level of the fluid in Transmission T is determined to be proper, the engine is shut off to stop transmission T from operating. Lines D6, D7 are disconnected from lines L1, L2 by releasing couplings C1, C2 (FIG. 1). If it is expected that transmission T will have the same servicing done on a regular, repeat basis, the remaining halves of couplings C1, C2 can be left joined to lines L1, L2 and can be used to connect lines L1, L2 together by using a small jumper comprised of a compatible set of two quick coupling devices which have been joined togther with a threaded stem. If transmission T will not likely have the total fluid exchange system servicing done on a regular, repeat basis, then the complete assemblies couplings C1, C2 are removed from lines L1, L2, and line L1 is securely reconnected to line L2 as it was before the cooling system was opened.

The engine is then operated again and the operator checks the now reconnected, closed cooling circuit of transmission T for any leaks and again checks the fluid level of the transmission T. The engine is then turned off, the service procedure is completed.

OPERATION OF ADDITIONAL EMBODIMENT (FIGS. 1, 3)

FIG. 3 is referred to unless otherwise noted with one exception. Because it is assumed that it is well understood that transmission T is illustrated in FIG. 1, it will not be repeated.

Lines D22, D23 are flexible hoses of sufficient length and are randomly connected by couplings C4, 03 in place of C2, C1 (FIG. 1) to cooling circuit lines L2, L1 while transmission T is not operating. Fresh fluid receptacle assembly 68 contains fresh fluid 68d of sufficient volume to provide, in the form described, at least five gallons of fresh fluid 68d and the volume of used fluid receptacle 90 is empty enough to receive at least five gallons of used fluid 90d, both thereby sufficient to service most automatic transmissions.

The engine is started and transmission T is put in drive at idle and used fluid 90d circulates freely through the cooling circuit which is now reconnected and closed inside the total fluid exchange system. The system is turned on by moving a main AC power switch located on panel 98 to its on position, which lights up the switch itself. A red light on control panel 98 indicates that the microprocessor is calibrating whereby signals from bi-directional flow indicators 82, 84 are recorded, processed and displayed digitally on control panel 98. If the direction of flow in the cooling circuit of Transmission T was not aligned as indicated from by flow indicators 82, 84, the microprocessor 96 sends a signal to valve 83 which reverses the connections of the lines interposed by valve 83. This establishes proper alignment of the system with the direction of flow through the cooling circuit if not already aligned. Fresh fluid 68d and used fluid 90d will now flow properly when the system is activated, The operator now draws a sample of used fluid 90d circulating through the cooling circuit from tap 85. When the calibration is complete during the inactive, calibration mode, a green light is displayed on panel 98.

At this point the operator has a choice of stopping the engine of the vehicle and servicing the pan and filter or screen if that is appropriate, or if not necessary, proceeding to activate the machine with transmission T operating, thereby beginning fluid exchange, Should the operator choose to stop transmission T from operating to service the pan, and filter or screen, a pause button on the control panel is pushed which illuminates a white light on panel 98 and the engine is turned off. After servicing the pan and filter or screen and refilling the pan, the engine may be restarted and run again at idle in drive and the button on panel 98 which activates the system is pushed. A fluid exchange in progress orange indicator light on panel 98 shows fluid is being exchanged and digital readouts on panel 98 will indicate the flow rates and the flow volumes of both fresh fluid 68d and used fluid 90d and the clarity of used fluid 90d.

When microprocessor 96 starts the exchange of fresh fluid for used, a number of simultaneous signals are sent to activate valve 80 and to control valves 78, 88 as valve 80 is activated to place the system in its activated, fluid exchanging mode. Valve 78 regulates the flow of fresh fluid to the desired rate and continues to make microsecond corrections as necessary based on signals provided by flow indicator 82. Valve 88 regulates the flow of used fluid to the desired rate and continues to make microsecond corrections based on signals provided by flow indicator 84. Microprocessor 96 establishes and maintains the rate of flow of both fresh and used fluid to be approximately the same, which is approximately the same rate at which fluid flowed through the cooling circuit system during calibration, a rate which was stored in its memory.

If either the fresh or the used flow stops while the system is in its activated, fluid exchanging mode, signals to microprocessor 96 from flow indicators 82, 84 indicate a loss of flow and microprocessor 96 inactivates valve 80 to spontaneously place the system in its usual resting, inactive, calibration mode, and indicates with a buzzer that a problem exists. After microproccesor 96 changes the system back to its inactive, calibration mode, if the flow does not resume to the level recorded during the initial calibration as indicated by flow indicators 82, 84, a warning buzzer continues signalling and the operator immediately turns the vehicle's engine off.

While the apparatus is operating in its activated mode, the clarity of used fluid 90d is constantly monitored by microprocessor 96 as indicated by clarity indicator 86. When clarity indicator 86 indicates that the same approximate clarity pre-set in the microprocessor for fresh fluid in general is reached, microprocessor 96 deactivates valve 80 to change the mode back to the inactive, calibration mode.

The operator is signaled by a red light indicator and a tone that that the mode was changed back to the inactive, calibration mode. At this time printer 100 produces a printed record of the pressure and rate of flow, before and after clarity of the fluid, total number of quarts used and total time of the actual fluid exchanging.

The operator then checks the fluid level in transmission T by checking the dipstick contained in filler tube F (FIG. 1) and adds additional fresh fluid if necessary. If in the rare event that the fluid level is somewhat too high, the excess can be bled off through tap 85. A sample of the fluid circulating in the cooling circuit which is now fresh is taken from tap 85. The engine is shut off and transmission T stops operating. couplings C3, C4 are disconnected and the cooling circuit is then closed in one of two ways as previously described in the prior operational description for the first embodiment.

SUMMARY, RAMIFICATIONS AND SCOPE

It should be exceedingly clear to the reader by now that the total fluid exchange system for automatic transmissions provides a quick, convenient, reliable, precise and effective means for changing all of the used, spent transmission fluid contained in an automatic transmission, approximately 75% to 80% of which has been virtually inaccessible in the transmission's internal and external circuits, and its torque convertor before this system was invented.

The total fluid exchange system for automatic transmissions is unique and unobvious to those skilled in the art because of its unique capabilities not previously reflected in the existing prior art, capabilities which appear enigmatic, but are significantly problem solving, when compared to that prior art. The system's unique, unobvious problem solving capabilities include:

The system's capability to allow a quick, random interconnect to the cooling circuit of an automatic transmission without having to determine the direction of flow in that cooling circuit before interconnecting the system.

The system's capability to reliably assess that unknown flow direction and determine and institute proper alignment between the system and cooling circuit while the transmission is operating after the interconnect has been made but before the system is activated to exchange fluids.

The system's capability to accurately assess rates of flow, and to calibrate to control those flows while the transmission is operating, but before the system is activated to exchange fluids.

The system's capability to be shifted smoothly from its inactive, calibration mode to its activated fluid exchanging mode and back again smoothly with the transmission operating in both modes at all times.

The system's capability to accurately assess rates of flow and to precisely adjust those rates as necessary while the system is activated, resulting in fresh fluid pumped into the transmission at approximately the same rate at which used, spent fluid is extracted, both at approximately the same rate at which fluid normally circulates when the cooling system is closed under similar operating conditions, thereby causing no damage to the transmission at any time.

The system's capability to accurately assess the clarity of the fluid being extracted, reliably indicating when the total exchange of fresh fluid for used, spent fluid is completed.

Although the description above contains many specifications, these should not be construed as limiting the scope of the invention but as merely providing illustrations of some of the presently preferred embodiments of this invention. For example, the invention can have a different appearance or structural composition without altering the basic premises or claims of the invention. Some of the indicator or control components can also vary somewhat in design, manufacture or function without substantially differing from the same basic operations of the component parts of the invention, and without substantially altering the invention's functioning as a system is stipulated in the Claims which are attached.

Thus the scope of the invention should be determined by the appended claims and their legal equivalents, rather than by the examples given.

What is claimed is:

1. A total fluid exchange system for vehicles having an automatic transmission and a fluid cooling circuit including the transmission and a fluid cooler with interconnecting fluid flow lines therebetween, said system including:
   a. means for interconnecting the system into a selected one of the fluid flow lines;
   b. a source of fresh fluid for exchange with used, spent fluid existing in the circuit;
   c. a receptacle for receiving the used, spent fluid;
   d. means for delivering fresh fluid from said fresh fluid source to said system;
   e. means for determining the direction of flow of fluid through the cooling circuit;
   f. means for aligning the flow of fluid through the system with the flow through the cooling circuit whereby used, spent fluid is dispersed therefrom and fresh fluid replaces the same; and,
   g. means for determining the clarity of the used, spent fluid and the clarity of the fresh fluid to determine the total replacement of the used, spent fluid with fresh fluid.

2. The system as set forth in claim 1 and:
   a. said means for delivering fluid from said fresh fluid source includes a source of pressurized gas communicating with said fresh fluid source; and
   b. means for controlling the pressure of the gas delivered from said gas source to said fresh fluid source.

3. The system as set forth in claim 1 and:
   a. valve means arranged and constructed to provide a fluid bypass whereby used, spent fluid is allowed to flow through the system; and
   b. tap means associated with said valve for determining the clarity of the used, spent fluid flowing through the system by drawing off a selected amount of used, spent fluid from the cooling circuit.

4. The system as set forth in claim 3 and;
   a. said valve means including a positionable valve body to selectively provide said fluid bypass in a first position; and,
   b. said valve body being shiftable to a second position to allow flow of fresh fluid into the system to disburse the used, spent fluid to said spent fluid receptacle.

5. The system as set forth in claim 1 and a fluid flow reversing valve including:
   a. a positionable valve body having a first position to allow fluid to flow directly therethrough; and,
   b. said positionable valve body being shiftable to a second position whereby fluid flow through said system is reversable in association with said means for determining the direction of flow of fluid through the cooling system.

6. The system as set forth in claim 2; and,
   a. fluid pressure indicating means arranged adjacent said source of fresh fluid to determine the pressure of fluid being delivered therefrom;
   b. fluid pressure indicating means arranged adjacent said used, spent fluid receptacle to determine the pressure of fluid being delivered thereto; and,
   c. means for controlling the pressure of the gas delivered from said gas source being adjustable whereby said fluid pressures of fluid being delivered from said fresh fluid source and fluid being delivered to said used, spent fluid receptacle may be substantially balanced to prevent operation of the transmission in a dry state.

7. The system as set forth in claim 1 and,
   a. said means for interconnecting said system into said selected one of said fluid flow lines including quick change, male and female hydraulic connectors arranged on said system; and,
   b. compatible male and female connectors arranged on respective ends of said interconnecting fluid flow lines of said cooling circuit whereby said system may be rapidly positioned into said cooling circuit.

8. The system as set forth in claim 1 and,
   a. said means for determining the direction of flow of fluid through the cooling circuit and said means for aligning the flow of fluid through the system include electronically operable members; and,
   b. microprocessor means arranged and constructed to receive signals from said electronically operable members and controlling said means for aligning the flow in response to the flow direction determination.

9. The system as set forth in claim 1 and said means for delivering fluid from said fresh fluid source including electronically operable pump means.

10. The system as set forth in claim 9 and said means for determining the clarity of used spent fluid and clarity of fresh fluid including infrared, electronically operable means whereby the total transfer and replacement of used, spent fluid with fresh fluid may be electronically determined.

\* \* \* \* \*